May 3, 1927.  W. F. WENDEL  1,627,132
ICE CREAM DISHER
Filed June 25, 1925
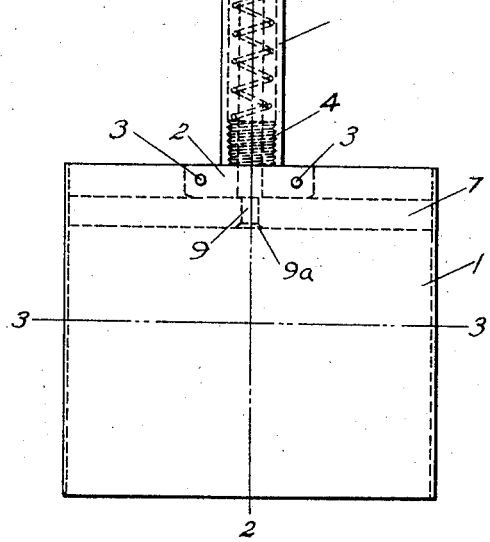
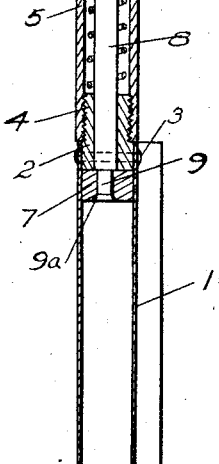
Fig.1.  Fig.2.
Fig. 3.
Inventor
William F. Wendel
By
Attorney Patented May 3, 1927.

1,627,132

UNITED STATES PATENT OFFICE.

WILLIAM F. WENDEL, OF GIRARD, PENNSYLVANIA.

ICE-CREAM DISHER.

Application filed June 25, 1925. Serial No. 39,485.

This invention is particularly adapted to form slabs of ice cream from which sandwiches may be made and is intended to simplify the design of such devices, both as to economy of manufacture, and ease of operating and cleaning the same. Features and details of the invention will appear more fully from the specification and claims.

The invention is illustrated in the accompanying drawings as follows:—

Fig. 1 shows an elevation of the device.
Fig. 2 a section on the line 2—2 in Fig. 1.
Fig. 3 a section on the line 3—3 in Fig. 1.

1 marks the shell of the disher. This is preferably of oblong form and slightly curved so that it will follow the wall of the ordinary ice cream container. A head 2 is secured between the sides of the wall of the upper end of the shell by rivets 3. It is provided with a nipple 4 on which is secured a sleeve 5. A cross handle 6 is secured to the upper end of the sleeve 5.

A plunger 7 is slidingly mounted in the shell. A stem 8 has a reduced end 9 and extends through the plunger and is secured to the plunger by heading over at 9ª. The stem 8 extends upwardly through the cross handle 6 and is provided with a handle 10 at its upper end, the handle 10 being screwed on to the stem.

A spring 11 is arranged within the sleeve 5 and is seated on the nipple 4 and against a filling or spacing sleeve 12 arranged on the upper end of the stem.

In the operation of the device the shell is forced into the cream filling the shell with cream. The cream is then forced out of the shell by the operator placing the fingers over the cross handle with the palm of the hand against the handle 10 and drawing the handles together. Thus, if desired, the operator can force the cream from the shell with one hand leaving the other hand free for handling the parts on which the cream is placed.

By removing the handle 10 the plunger may be dropped out of the shell and thus the shell is left open for cleaning. If desired also the handle 6 may be removed permitting the spring to be removed so as to clean all the parts.

What I claim as new is:—

In an ice cream disher, the combination of an oblong thin-walled shell open at its front end; a plunger in the shell; a head secured in the shell; a sleeve secured to the head; a handle on the sleeve; a stem on the plunger extending through the sleeve and handle on the sleeve; a handle on the stem; a spring in the sleeve; and a sleeve on the stem extending from the handle on the stem into the first-mentioned sleeve and engaging at its end the spring.

In testimony whereof I have hereunto set my hand.

WILLIAM F. WENDEL.